(12) United States Patent
Matsunaga et al.

(10) Patent No.: US 8,296,028 B2
(45) Date of Patent: Oct. 23, 2012

(54) CONTROL DEVICE AND CONTROL METHOD FOR LOCKUP CLUTCH AND ENGINE TORQUE IN A VEHICLE

(75) Inventors: Hitoshi Matsunaga, Anjo (JP); Koji Oshima, Nagoya (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 281 days.

(21) Appl. No.: 12/678,193

(22) PCT Filed: Oct. 30, 2008

(86) PCT No.: PCT/IB2008/002906
§ 371 (c)(1),
(2), (4) Date: Mar. 15, 2010

(87) PCT Pub. No.: WO2009/056953
PCT Pub. Date: May 7, 2009

(65) Prior Publication Data
US 2010/0262346 A1 Oct. 14, 2010

(30) Foreign Application Priority Data
Oct. 31, 2007 (JP) ................................. 2007-283017

(51) Int. Cl.
*F16H 61/14* (2006.01)
*F16D 48/00* (2006.01)

(52) U.S. Cl. ............ 701/67; 477/169; 192/3.31; 701/68
(58) Field of Classification Search .................... 701/67, 701/68; 477/107, 109, 174, 176, 181, 169, 477/175; 192/3.31
See application file for complete search history.

(56) References Cited

U.S. PATENT DOCUMENTS

| | | | | |
|---|---|---|---|---|
| 4,467,673 A * | 8/1984 | Hamada et al. | ................. | 477/61 |
| 4,468,988 A * | 9/1984 | Hiramatsu | ...................... | 477/65 |
| 5,291,979 A * | 3/1994 | Iizuka | ............................ | 192/92 |
| 5,601,511 A * | 2/1997 | Michioka | ........................ | 477/98 |
| 5,865,709 A * | 2/1999 | Tamura et al. | ................ | 477/181 |
| 6,042,507 A | 3/2000 | Genise et al. | | |
| 6,341,679 B1 * | 1/2002 | Abe et al. | ..................... | 192/3.29 |
| 6,449,550 B1 | 9/2002 | Lutz et al. | | |
| 6,780,140 B2 * | 8/2004 | Okamoto et al. | ............... | 477/62 |
| 7,674,204 B2 * | 3/2010 | Turpin et al. | .................. | 477/181 |
| 2004/0064231 A1* | 4/2004 | Oohori et al. | .................. | 701/54 |
| 2007/0129215 A1 | 6/2007 | Kim | | |

FOREIGN PATENT DOCUMENTS

| | | |
|---|---|---|
| DE | 102 42 821 A1 | 3/2004 |
| FR | 2 870 912 A1 | 12/2005 |
| JP | 03-144500 A | 6/1991 |
| JP | 03-182646 A | 8/1991 |
| JP | 03-182648 A | 8/1991 |
| JP | 03-185269 A | 8/1991 |
| JP | 09-042440 A | 2/1997 |
| JP | 2000-055185 A | 2/2000 |
| JP | 2003-065431 A | 3/2003 |
| JP | 2004-263875 A | 9/2004 |

* cited by examiner

*Primary Examiner* — Joseph Rocca
(74) *Attorney, Agent, or Firm* — Sughrue Mion, PLLC

(57) ABSTRACT

If the a rotational speed difference (Ne–Nt) between an engine speed (Ne) and a turbine speed (Nt) when it is determined that a lock-up ON condition (OFF→ON) is satisfied is large, the lock-up clutch is not engaged but torque reduction control is executed to reduce the engine speed (Ne), thus reducing the rotational speed difference (Ne–Nt) (steps ST13 and ST14). Then, once the rotational speed difference (Ne–Nt) has been reduced to the target rotational speed difference (Nslp), the lock-up clutch is engaged (steps ST15 and ST16). In this manner, excessive heating of the friction material of the lock-up clutch is suppressed which increases the longevity of the friction material.

11 Claims, 10 Drawing Sheets

|      | C1 | C2 | C3 | C4 | B1 | B2 | B3 | B4 | F0 | F1 | F2 | F3 |
|------|----|----|----|----|----|----|----|----|----|----|----|----|
| P    |    |    |    |    |    |    |    |    |    |    |    |    |
| R    |    |    | ○  |    | ◎  |    |    | ○  |    | ○  |    |    |
| N    |    |    |    |    |    |    |    |    |    |    |    |    |
| 1st  | ○  |    |    | ◎  |    |    |    | ◎  | ○  |    |    | ○  |
| 2nd  | ○  |    |    | ◎  |    | ◎  | ○  |    | ○  | ○  | ○  |    |
| 3rd  | ○  |    | ○  | ◎  | ◎  |    | △  |    | ○  | ○  |    |    |
| 4th  | ○  | ○  | △  | ◎  |    |    | △  |    | ○  |    |    |    |
| 5th  | △  | ○  | ○  |    | ○  |    | △  |    |    |    |    |    |
| 6th  | △  | ○  |    |    | △  | ○  | △  |    |    |    |    |    |

○ ENGAGED
◎ ENGAGED DURING ENGINE BRAKING
△ ENGAGED BUT NOT RELATED TO POWER TRANSMISSION

CONTROL DEVICE AND CONTROL METHOD FOR LOCKUP CLUTCH AND ENGINE TORQUE IN A VEHICLE

BACKGROUND OF THE INVENTION

1. Field of the Invention

The present invention relates to a control device and control method for a vehicle in which an engine (internal combustion engine) and an automatic transmission are installed and, more particularly, to a control device and control method for a vehicle equipped with a torque converter having a lock-up clutch and an automatic transmission.

2. Description of the Related Art

In a vehicle having an engine, a transmission transmits torque and rotational speed, generated by the engine, to driving wheels in accordance with vehicle running states. The transmission includes an automatic transmission that automatically and optimally sets a gear ratio between the engine and the driving wheels.

The automatic transmission installed in a vehicle may be, for example, a planetary gear transmission that uses frictional engagement elements, such as clutches and brakes, and a planetary gear set to set a gear, and a belt-type continuously variable transmission (CVT) that steplessly adjusts the gear ratio.

In a vehicle equipped with a planetary gear automatic transmission, a shift line map that includes shift lines (gear shift lines) for attaining an optimal gear based on the vehicle speed and the accelerator operation amount (or throttle opening degree) is stored in an electronic control unit (ECU), or the like. A target gear is calculated by referring to the shift line map based on the vehicle speed and the accelerator operation amount, and then clutches, brakes and one-way clutches, which serve as frictional engagement elements, are engaged or released in accordance with the target gear to thereby set the gear automatically.

In a belt-type continuously variable transmission, a belt is wound around a primary pulley (input pulley) and a secondary pulley (output pulley), which are provided with a pulley groove (V groove). The width of the pulley groove of one pulley is increased, while at the same time, the width of the pulley groove of the other pulley is reduced, to thereby continuously vary the radii (effective diameters) at which the belt is wound around the respective pulleys. Thus, the belt-type continuously variable transmission steplessly sets a gear ratio.

In vehicles equipped with the above automatic transmissions, a shift lever is provided and is operated by the driver. Operating the shift lever changes the shift position of the automatic transmission, for example, to P position (parking range), R position (reverse running range), N position (neutral range), D position (forward running range), or the like. In addition, in recent years, an automatic transmission having a manual transmission mode (so-called automatic transmission having a sequential mode) have become available. This enables operation of the shift lever to selectively shift the gear of the automatic transmission.

In addition, in the vehicle equipped with the automatic transmission, a torque converter may be arranged in a power transmission path from the engine to the automatic transmission. The torque converter is a hydraulic power transmission and, for example, includes a pump impeller coupled to an engine output shaft (crankshaft); a turbine runner coupled to an input shaft of the automatic transmission; and a stator, provided between the pump impeller and the turbine runner via a one-way clutch. The pump impeller rotates together with the engine output shaft. Then, hydraulic fluid discharged from the pump impeller drives the turbine runner to rotate. Thus, the output torque of the engine is transferred to the input shaft of the automatic transmission.

Furthermore, torque converters that include a lock-up clutch are widely used. The lock-up clutch is engaged (lock-up ON) or released (lock-up OFF) depending on operating conditions to thereby improve fuel consumption rate (hereinafter, called fuel consumption).

Japanese Patent Application Publication No. 2004-263875 (JP-A-2004-263875) and Japanese Patent Application Publication No. 3-182648 (JP-A-3-182648) describe technologies related to controls for a vehicle equipped with a lock-up clutch.

JP-A-2004-263875 describes that during slip control for a lock-up clutch (control for adjusting a transmission torque without completely engaging the lock-up clutch), when an accelerator pedal is depressed, operation of a throttle valve is restricted. Thus, racing of the engine is prevented, and degradation of the lock-up clutch is reduced.

JP-A-3-182648 describes that during engagement of a lock-up clutch, when rotational speed the difference between the rotational speed of an engine drive shaft (engine speed) and the rotational speed of a torque converter driven shaft (turbine speed) is smaller than or equal to a predetermined value, the torque of engine power output is reduced. Thus, a torque shock at the time of lock-up is reduced.

Incidentally, lock-up is one of indispensable manners to transmission efficiency of the automatic transmission; however, engagement of a lock-up clutch that uses wet friction material requires durability of the friction material against heating at the time of engagement. In particular, when power input from the engine is large, rotational speed the difference between the engine speed and the turbine speed of the torque converter increases and, therefore, the friction material generates a large amount of heat when the lock-up clutch engages. Thus, it is necessary to use a plurality of sheets of friction material to ensure an engaged state or to take other measures, with a consequence that the size of the torque converter is increased.

In addition, if it is still difficult to handle the heat at the time of engagement even taking the above measures, the lock-up control is cancelled (lock-up clutch is released), thus maintaining the large rotational speed difference between the engine speed and the turbine speed. When the above large rotational speed difference continues for a relatively long period of time, hydraulic fluid (automatic transmission fluid (ATF)) in the torque converter heats up due to agitation and finally the hydraulic fluid overheats.

Note that JP-A-2004-263875 describes a technology for preventing racing of the engine during slip control on the lock-up clutch. In addition, JP-A-3-182648 describes that in order to reduce shock at the time of lock-up, torque of the engine power is reduced when the lock-up clutch is engaged. However, neither JP-A-2004-263875 and JP-A-3-182648 suggest anything about ensuring of the durability of the friction material when the lock-up clutch is engaged. Thus, the technologies described in JP-A-2004-263875 and JP-A-3-182648, provides no solution for the above problem.

SUMMARY OF THE INVENTION

The invention provides a vehicle, in which an automatic transmission having a lock-up clutch is installed, with control that suppresses heating when the lock-up clutch is engaged.

One aspect of the invention provides a control device for a vehicle that includes an engine; an automatic transmission; a torque converter arranged between the engine and the automatic transmission; and a lock-up clutch that directly connects an input side of the torque converter with an output side of the torque converter.

Then, the control device includes: an engine speed detector that detects a rotational speed of the engine; a turbine speed detector that detects a turbine speed of the torque converter; a rotational speed difference calculation unit that calculates a rotational speed difference between the engine speed and the turbine speed; a torque reduction control unit that executes torque reduction control to reduce the output torque of the engine; a lock-up control unit that controls the engagement or release of the lock-up clutch; and a lock-up determination unit that determines, whether a lock-up ON condition or a lock-up OFF condition is satisfied, if when the rotational speed difference calculated by the rotational speed difference calculation unit when the lock-up determination unit determines that the lock-up ON condition (OFF→ON) is satisfied exceeds a predetermined target rotational speed difference, the torque reduction control is executed, and the lock-up clutch is engaged when the rotational speed difference calculated by the rotational speed difference calculation unit has been reduced to the target rotational speed difference.

In addition, another aspect of the invention provides a control method for a vehicle that includes an engine; an automatic transmission; a torque converter arranged between the engine and the automatic transmission; and a lock-up clutch that directly connects an input side of the torque converter with an output side of the torque converter. The control method includes: detecting a rotational speed of the engine; detecting a turbine speed of the torque converter; calculating a rotational speed rotational speed difference between the engine speed and the turbine speed; determining, on the basis of a running state of the vehicle, whether a lock-up ON condition or a lock-up OFF condition is satisfied; executing torque reduction control to reduce an output torque of the engine when the rotational speed difference calculated when it is determined that the lock-up ON condition is satisfied exceeds a predetermined target rotational speed difference; and engaging the lock-up clutch when the rotational speed difference has been reduced to the target rotational speed difference.

According to the above control device and control method, in consideration of the fact that the friction material of the lock-up clutch may possibly be subjected to thermal degradation if the lock-up clutch is immediately engaged when the rotational speed difference (engine speed Ne−turbine speed Nt) is large, the torque reduction control is executed to reduce the engine speed to thereby reduce the rotational speed difference (Ne−Nt). Then, when the rotational speed difference (Ne−Nt) between the engine speed and the turbine speed has been reduced to the target rotational speed difference (specifically, the rotational speed difference at a level at which durability of the lock-up clutch may be ensured), the lock-up clutch is engaged.

In this way, after the rotational speed difference (Ne−Nt) between the engine speed Ne and the turbine speed Nt is reduced, the lock-up clutch is engaged. Thus, ["excessive"?] heating of the friction material of the lock-up clutch may be suppressed. By so doing, durability of the friction material may be ensured without increasing the heat capacity of the friction material of the lock-up clutch. As a result, the size of the lock-up clutch may be reduced. Note that when the rotational speed difference (Ne−Nt) at the time when the lock-up ON condition is satisfied is smaller than or equal to the target rotational speed difference, durability of the friction material may be ensured even when the lock-up clutch is engaged. Thus, the lock-up clutch is immediately engaged.

Here, in the aspects of the invention, the target rotational speed difference used to determine whether to engage the lock-up clutch may be set in consideration of, for example, a capacity (heat capacity) of the lock-up clutch or a heating value (i.e. calorific value) of the lock-up clutch at the time of engagement. In addition, in consideration of the fact that a heating value of the lock-up clutch at the time of engagement is large when the difference between an input torque of the lock-up clutch and an output torque of the lock-up clutch is large, the target rotational speed difference Nslp may be set on the basis of the difference between the input torque and the output torque.

In the aspects of the invention, a specific example of the torque reduction control may include control for reducing an output torque of the engine through control for reduction in fuel injection amount or control for retardation of ignition timing. In addition, when a variable valve timing mechanism (VVT mechanism) is provided to vary the timing of the engine valve (intake valve, exhaust valve), the valve timing may be varied by the VVT mechanism to thereby reduce an output torque of the engine.

Note that the torque may be reduced by any one of control for reduction in fuel injection amount, control for retardation of ignition timing or control for change of valve timing using the VVT mechanism, or in combination.

A more specific configuration of the control device may be such that the torque reduction control is executed when the rotational speed difference exceeds a predetermined upper limit rotational speed difference (upper limit rotational speed difference>target rotational speed difference) when the lock-up determination unit determines that the lock-up ON condition (OFF→ON) is satisfied, and when the rotational speed difference calculated by the rotational speed difference calculation unit has been reduced to the target rotational speed difference, the lock-up clutch is engaged.

In addition, the torque reduction control may be executed when the rotational speed difference calculated when it is determined that the lock-up ON condition is satisfied is larger than an upper limit rotational speed difference, and the lock-up clutch may be engaged when the rotational speed difference has been reduced to the target rotational speed difference.

In the above control device and control method, when the upper limit rotational speed difference is set in consideration of, for example, a heating value due to shearing of hydraulic fluid) of the torque converter and cooling ability of the vehicle, it is possible to prevent hydraulic fluid of the torque converter from overheating.

Here, the upper limit rotational speed difference may be set in consideration of, for example, a heating value of the lock-up clutch at the time of engagement or may be set in consideration of a torque step that occurs on an axle at the time when the lock-up clutch is engaged.

According to the aspects of the invention, when it is determined that the lock-up ON condition is satisfied, if the rotational speed difference between the engine speed Ne and the turbine speed Nt is large, the torque reduction control for the engine is executed, and the lock-up clutch is engaged after the rotational speed difference has been reduced to the target rotational speed difference. Thus, excessive heating of the friction material of the lock-up clutch may be suppressed and, as a result, the size of the lock-up clutch may be reduced.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
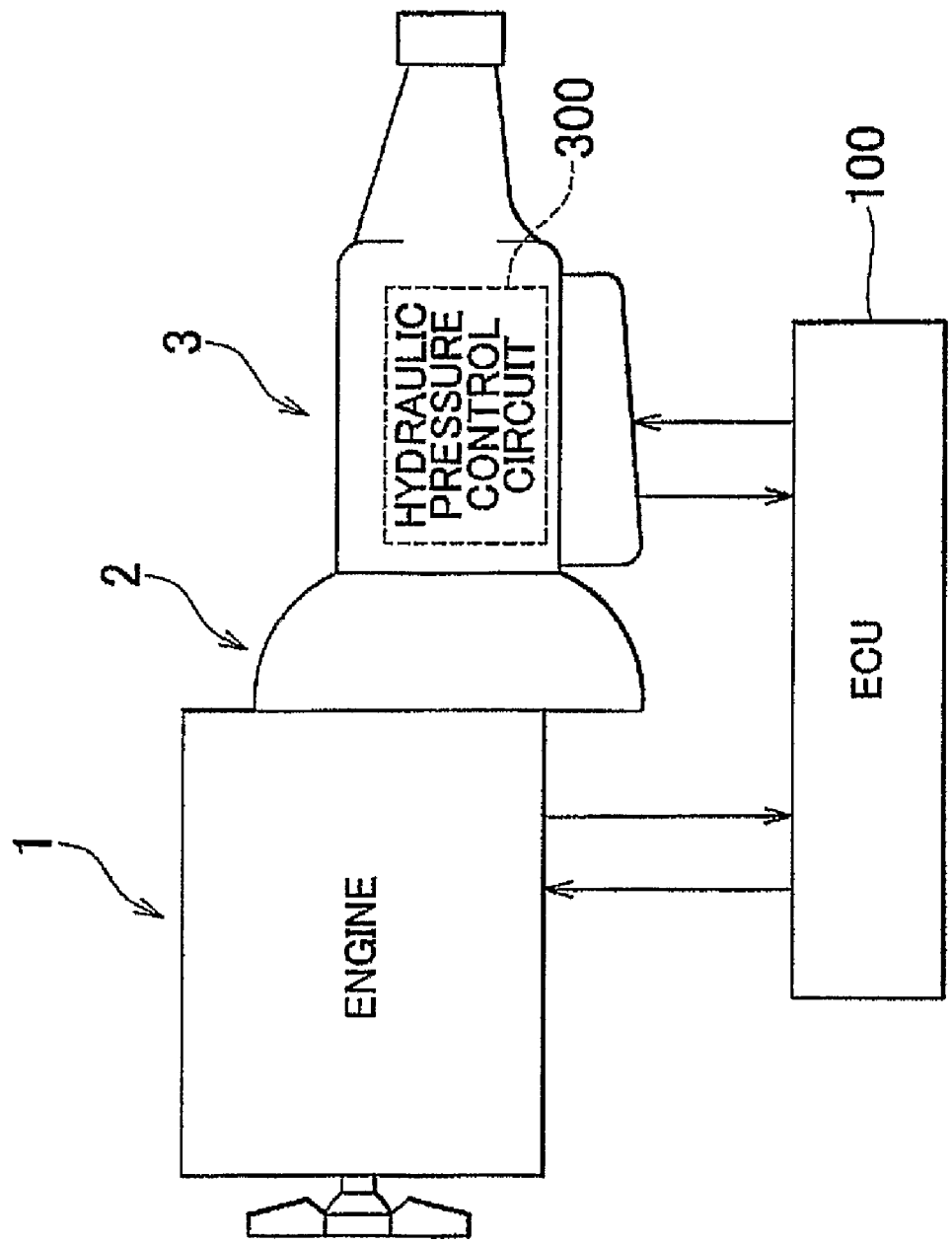
FIG. 1 is a schematic configuration diagram that shows a portion of a vehicle according to an embodiment of the invention.

FIG. 1 is a schematic configuration diagram that shows a portion of a vehicle according to an embodiment of the invention. The vehicle of this example is an front-engine, rear-wheel-drive (FR) vehicle that includes an engine 1; a torque converter 2; an automatic transmission 3; an ECU 100; and the like. A control device and control method for a vehicle according to the aspects of the invention may be implemented by a program that is executed by the ECU 100. The engine 1, torque converter 2, automatic transmission 3 and various units of the ECU 100 will be described below.

Figure 2:
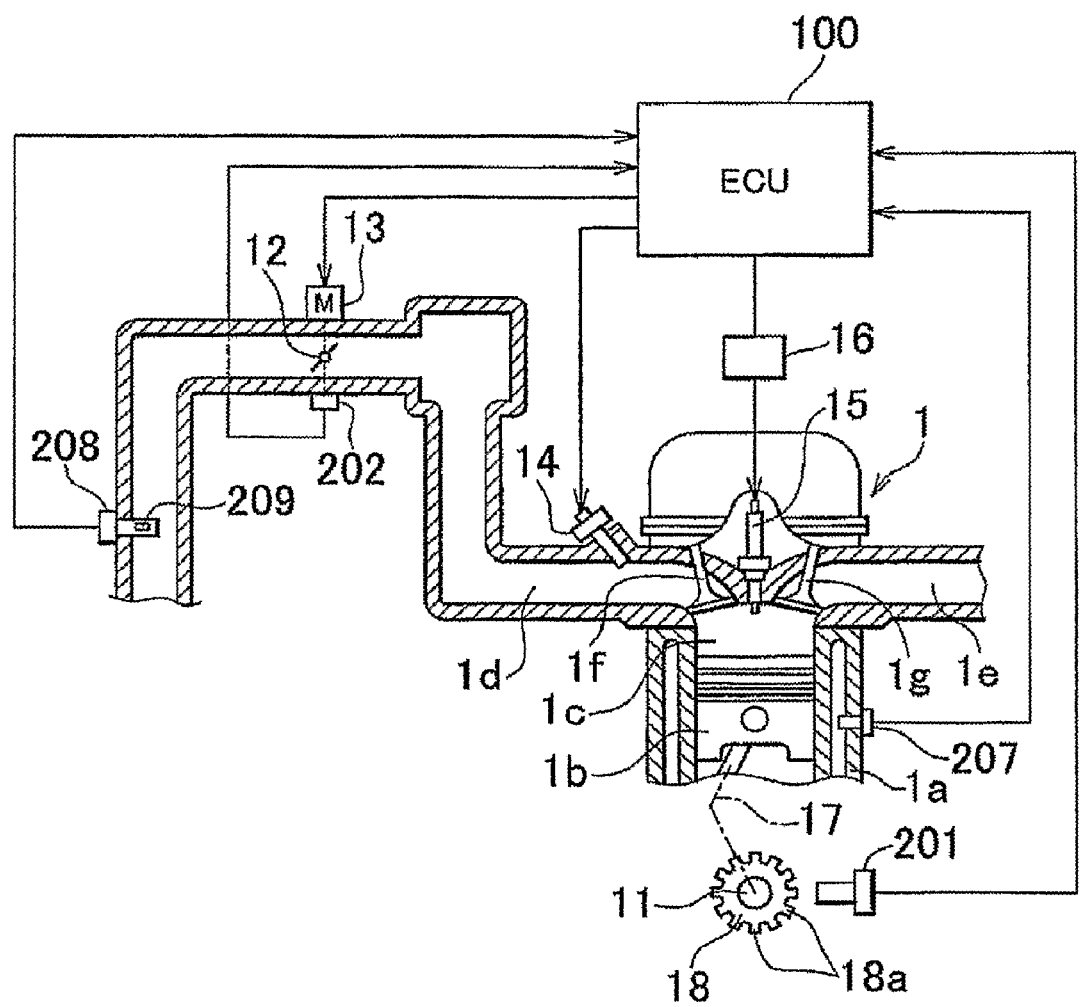
FIG. 2 is a schematic configuration diagram of an engine that is installed in the vehicle shown in FIG. 1.

The engine 1 may be, for example, a four-cylinder gasoline engine. A cylinder block 1a, in which the cylinders are formed, accommodates pistons 1b, as shown in FIG. 2. The pistons 1b reciprocally move vertically. The pistons 1b are coupled through a connecting rod 17 to a crankshaft 11. The reciprocation of the pistons 1b is converted by the connecting rod 17 into rotation of the crankshaft 11. The crankshaft 11 is connected to an input shaft of the torque converter 2.

The rotational speed of the crankshaft 11 (engine speed Ne) is detected by an engine speed sensor 201. The engine speed sensor 201 may be, for example, an electromagnetic pickup that generates a pulse-like signal (output pulse) corresponding to protrusions 18a of a signal rotor 18 when the crankshaft 11 rotates.

A coolant temperature sensor 207 is arranged at the cylinder block 1a of the engine 1 and detects the engine coolant temperature. Spark plugs 15 are arranged in each combustion chamber 1c of the engine 1. The ignition timing of each spark plug 15 is adjusted by an igniter 16. The igniter 16 is controlled by the ECU 100.

The combustion chambers 1c of the engine 1 communicate with an intake passage 1d and an exhaust passage 1e. Intake valves if are provided between the intake passage 1d and the combustion chambers 1c of each cylinder. The intake valves 1f are opened or closed to provide or block fluid communication between the intake passage 1d and the combustion chambers 1c. In addition, exhaust valves 1g are provided between the combustion chambers 1c and the exhaust passage 1e. The exhaust valves 1g are opened or closed to provide or block fluid communication between the combustion chambers 1c and the exhaust passage 1e. The intake valves 1f and exhaust valves 1g are respectively opened or closed as an intake cam shaft and an exhaust cam shaft are rotated through rotation of the crankshaft 11.

A hot wire air flow meter (intake air amount sensor) 208, an intake air temperature sensor 209 (embedded in the air flow meter 208), and an electronically controlled throttle valve 12 that adjusts the intake air amount of the engine 1 are arranged in the intake passage 1d. The throttle valve 12 is driven by a throttle motor 13. The throttle opening degree of the throttle valve 12 may be electronically controlled independently of accelerator pedal operation by the driver, and the opening degree (throttle opening degree) is detected by a throttle opening degree sensor 202. In addition, the throttle motor 13 is controlled and driven by the ECU 100.

Specifically, the throttle opening degree of the throttle valve 12 is controlled so as to attain an optimum intake air amount (target intake air amount) based on an operating state of the engine 1, such as an engine speed Ne detected by the engine speed sensor 201, driver's accelerator pedal depression amount (accelerator operation amount), and the like. More specifically, an actual throttle opening degree of the throttle valve 12 is detected by the throttle opening degree sensor 202, and the throttle motor 13 of the throttle valve 12 is feedback-controlled so that the actual throttle opening degree coincides with the throttle opening degree (target throttle opening degree) that yields the target intake air amount.

Then, fuel injection valves 14 are arranged in the intake passage 1d. Fuel of a predetermined pressure is supplied by a fuel pump from a fuel tank to the fuel injection valves 14, and the fuel is injected into the intake passage 1d. The injected fuel is mixed with intake air to become an air fuel mixture and introduced into one of the combustion chambers 1c of the engine 1. The air fuel mixture (fuel+air) introduced in the combustion chamber 1c is ignited by the spark plug 15 to burn and combust. As the air fuel mixture burns and combusts in the combustion chamber 1c, the corresponding piston 1b reciprocally moves to thereby rotate the crankshaft 11. The operating state of the above described engine 1 is controlled by the ECU 100.

Figure 3:
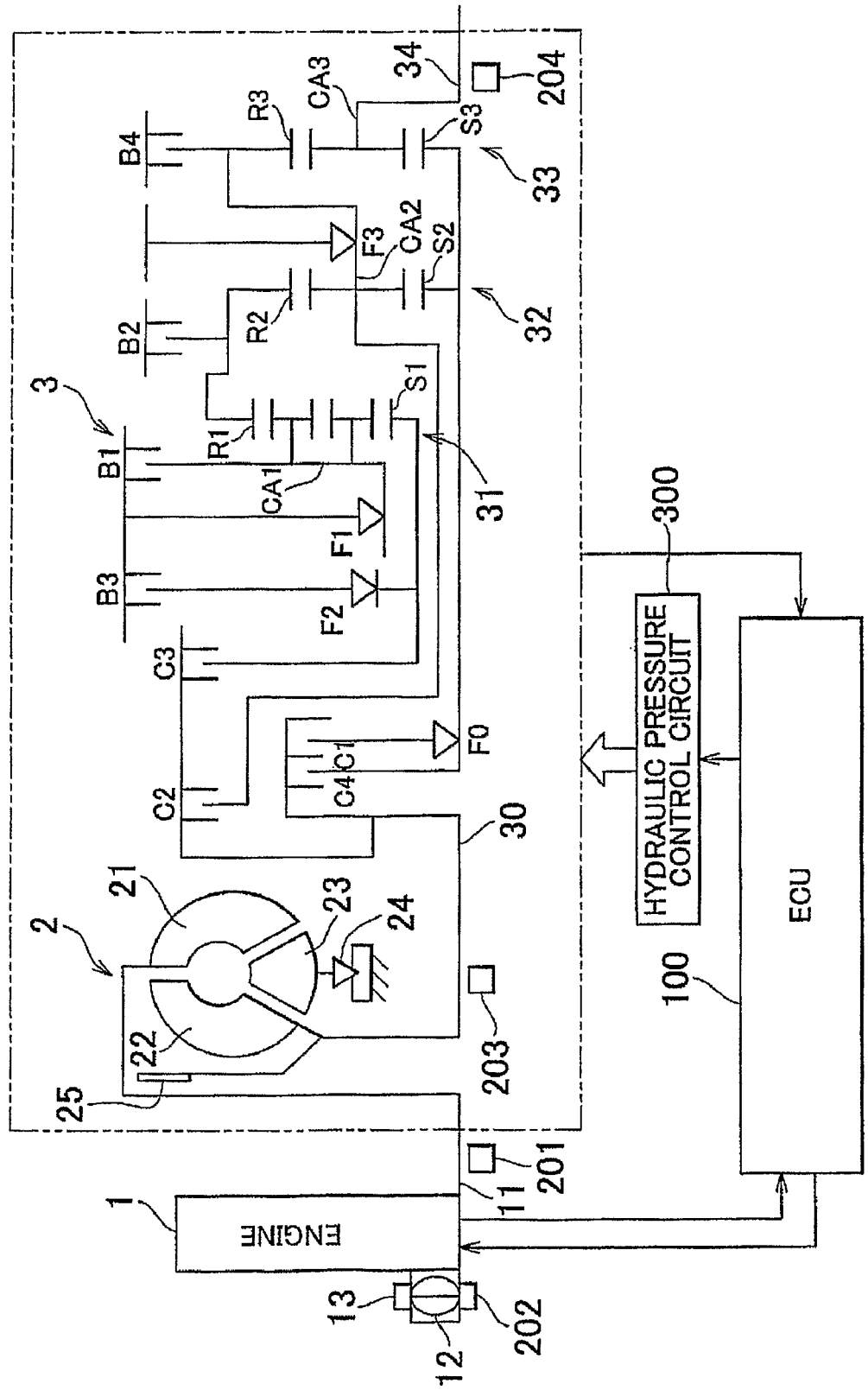
FIG. 3 is a schematic configuration diagram of the engine, a torque converter, and an automatic transmission that are installed in the vehicle shown in FIG. 1 and a block diagram of a control system.

As shown in FIG. 3, the torque converter 2 includes an input shaft side pump impeller 21, an output shaft side turbine runner 22, a stator 23 that provides a torque amplifying function, and a one-way clutch 24. Power is transmitted between the pump impeller 21 and the turbine runner 22 via fluid.

The torque converter 2 is provided with a lock-up clutch 25 that is able to directly connect the input side with the output side. Once the lock-up clutch 25 is completely engaged, the pump impeller 21 and the turbine runner 22 rotates integrally. In addition, as the lock-up clutch 25 is engaged in a predetermined slipped state, the turbine runner 22 is driven for rotation following the pump impeller 21 at a predetermined slip rate. The torque converter 2 and the automatic transmission 3 are connected by a rotation shaft. A turbine speed Nt of the torque converter 2 is detected by a turbine speed sensor 203. Engagement and release of the lock-up clutch 25 of the torque converter 2 are controlled by a hydraulic pressure control circuit 300 and the ECU 100.

As shown in FIG. 3, the automatic transmission 3 is a planetary gear transmission that includes a double pinion type first planetary gear set 31, a single pinion type second planetary gear set 32, and a single pinion type third planetary gear set 33. Power output from the output shaft 34 of the automatic transmission 3 is transmitted through a propeller shaft, a differential gear, drive shafts, and the like, to driving wheels.

A sun gear S1 of the first planetary gear set 31 of the automatic transmission 3 is selectively coupled to the input shaft 30 via a clutch C3. In addition, the sun gear S1 is selectively coupled to the housing via a one-way clutch F2 and a brake B3, and rotation in the reverse direction (in the direction opposite to rotation of the input shaft 30) is blocked. A carrier CA1 of the first planetary gear set 31 is selectively coupled to the housing via a brake B1, and rotation of the carrier CA1 in the reverse direction is always blocked by the one-way clutch F1 provided in parallel with the brake 131. A ring gear R1 of the first planetary gear set 31 is integrally connected to a ring gear R2 of the second planetary gear set 32, and is selectively coupled to the housing via a brake B2.

A sun gear S2 of the second planetary gear set 32 is integrally connected to a sun gear S3 of the third planetary gear set 33, and is selectively coupled to the input shaft 30 via a clutch C4. In addition, the sun gear S2 is selectively coupled to the input shaft 30 via a one-way clutch F0 and a clutch C1, and rotation of the sun gear S2 in the reverse direction relative to the input shaft 30 is blocked.

A carrier CA2 of the second planetary gear set 32 is integrally connected to a ring gear R3 of the third planetary gear set 33, and is selectively coupled to the input shaft 30 via a clutch C2, while being selectively coupled to the housing via a brake B4. In addition, rotation of the carrier CA2 in the reverse direction is always blocked by a one-way clutch F3 provided in parallel with the brake B4. Then, a carrier CA3 of the third planetary gear set 33 is integrally connected to the output shaft 34. A rotational speed of the output shaft 34 is detected by an output shaft speed sensor 204.

Figures 4, 5:
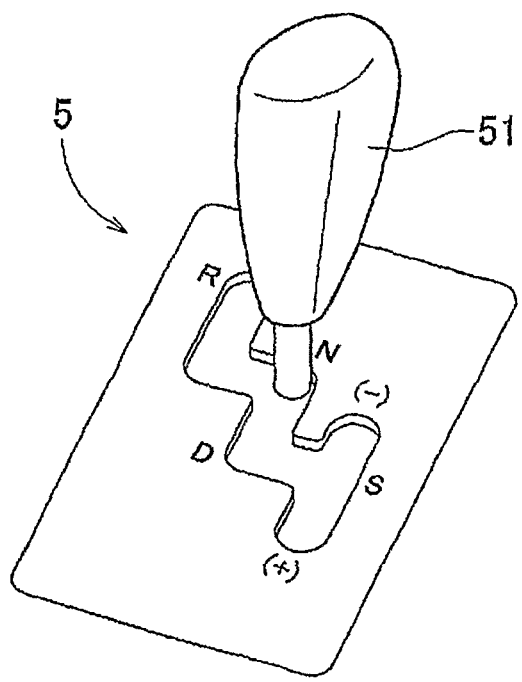
FIG. 4 is an operation table of the automatic transmission shown in FIG. 3.
FIG. 5 is a perspective view that shows the configuration of a shift lever portion of a gear shift device.

Engagement and release of the clutches C1 to C4, brakes B1 to B4 and one-way clutches F0 to F3 of the above described automatic transmission 3 are shown in the operation table of FIG. 4. In the operation table of FIG. 4, "circle" represents "engaged", and "blank" represents "released". In addition, "double circle" represents "engaged during engine braking", and "triangle" represents "engaged but not related to power transmission".

As shown in FIG. 4, in the automatic transmission 3 of this example, in a forward first gear (1st), the clutch C1 is engaged, and the one-way clutches F0 and F3 operate. In a forward second gear (2nd), the clutch C1 and the third brake B3 are engaged, and the one-way clutches F0, F1, and F2 operate.

In a forward third gear (3rd), the clutches C1 and C3 are engaged while the brake B3 is engaged, and the one-way clutches F0 and F1 operate. In a forward fourth gear (4th), the clutches C1, C2, and C3 are engaged while the brake B3 is engaged, and the one-way clutch F0 operates.

In a forward fifth gear (5th), the clutches C1, C2, and C3 are engaged while the brakes B1 and B3 are engaged. In a forward sixth gear (6th), the clutches C1 and C2 are engaged while the brakes B1, B2, and B3 are engaged. In addition, in a reverse gear (R), the clutch C3 is engaged while the brake B4 is engaged, and the one-way clutch F1 operates.

As described above, in the automatic transmission 3 of this example, the frictional engagement elements, such as the clutches C1 to C4, brakes B1 to B4 and one-way clutches F0 to F3, are engaged or released in a predetermined state, thus setting the appropriate gear. Engagement and release of these clutches C1 to C4 and brakes B1 to B4 are controlled by the hydraulic pressure control circuit 300 and the ECU 100.

A gear shift device 5, as shown in FIG. 5, is arranged near driver's seat of the vehicle. A shift lever 51 is provided for the gear shift device 5. The gear shift device 5 has a reverse (R) position, a neutral (N) position, a drive (D) position, and a sequential (S) position, and allows the driver to change the shift lever 51 to a desired position. The shift positions of these reverse (R) position, neutral (N) position, drive (D) position, and sequential (S) position (including the following "+" position and "−" position) are detected by a shift position sensor 206 (see FIG. 6).

Hereinafter, situations in which the shift positions are selected and operation modes of the automatic transmission 3 at that time will be described for each shift position ("N position", "R position", "D position" and "S position").

N position is selected when the input shaft 30 is decoupled from the output shaft 34 of the automatic transmission 3. As the shift lever 51 is operated to N position, the clutches C1 to C4, brakes B1 to B4 and one-way clutches F0 to F3 of the automatic transmission 3 all are released (see FIG. 4).

R position is selected when the vehicle is driven in reverse. As the shift lever 51 is operated to R position, the automatic transmission 3 is shifted to the reverse gear.

D position is selected when the vehicle is driven forward. As the shift lever 51 is operated to D position, a plurality of forward gears (forward six gears) of the automatic transmission 3 are automatically shifted depending on a driving state of the vehicle.

S position is a manual shift position that is selected when the driver manually shifts the plurality of forward gears (forward six gears). A "−" position and a "+" position are provided on the front and rear sides, respectively, of the S position. The "+" position is a position to which the shift lever 51 is operated when upshift is manually operated. The "−" position is a position to which the shift lever 51 is operated when downshift is manually operated. When the shift lever 51 is at S position, as the shift lever 51 is operated to "+" position or "−" position with respect to S position as a neutral position, a forward gear of the automatic transmission 3 upshifts or downshifts. Specifically, the gear sequentially upshifts (for example, 1st→2nd→ . . . →6th) each time the shift lever 51 is operated to "+" position. Likewise, the gear downshifts gear by gear (for example, 6th→5th→ . . . →1st) each time the shift lever 51 is operated to "−" position.

Figure 6:
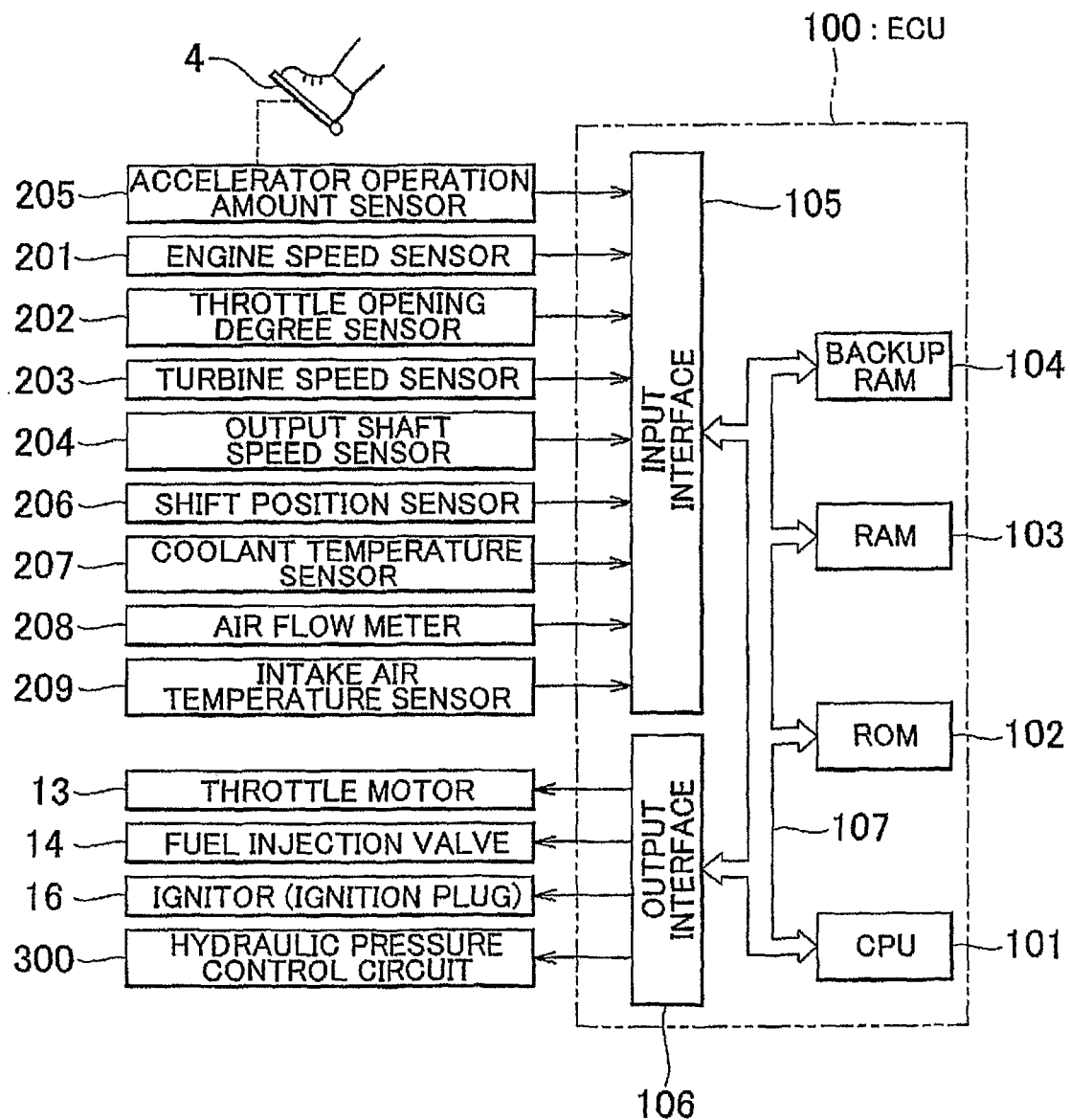
FIG. 6 is a block diagram that shows the configuration of a control system, such as an ECU.

As shown in FIG. 6, the ECU 100 includes a CPU 101, a ROM 102, a RAM 103, a backup RAM 104, and the like.

The ROM 102 stores various programs including a program for executing shift control that sets the gear of the automatic transmission 3 based on the running state of the vehicle in addition to control related to basic driving of the vehicle [??]. The shift control will be specifically described later.

The CPU 101 executes arithmetic processes in accordance with various control programs and maps, which are stored in the ROM 102. In addition, the RAM 103 is a memory that temporarily stores processing results in the CPU 101 and data, and the like, input from the sensors. The backup RAM 104 is a nonvolatile memory that stores data, and the like, that should be saved when the engine 1 is stopped.

The CPU 101, ROM 102, RAM 103 and backup RAM 104 are connected one another through a bus 107, and are further connected to an input interface 105 and an output interface 106.

The input interface 105 is connected to the engine speed sensor 201, the throttle opening degree sensor 202, the turbine speed sensor 203, the output shaft speed sensor 204, an accelerator operation amount sensor 205 that detects the opening degree of an accelerator pedal 4, the shift position sensor 206, the coolant temperature sensor 207, the air flow meter (intake air amount sensor) 208, the intake air temperature sensor 209, and the like. Signals from these sensors are input to the ECU 100.

The output interface 106 is connected to the throttle motor 13 of the throttle valve 12, each injector 14, the igniter 16 of each spark plug 15, the hydraulic pressure control circuit 300, and the like.

The ECU 100 executes various controls of the engine 1, including control for opening degree of the throttle valve 12, ignition timing control (control for driving of the ignitor 16), fuel injection amount control (control for opening or closing of the injectors 14), and the like, of the engine 12 based on the output signals from the above described various sensors.

In addition, the ECU 100 outputs a solenoid control signal (hydraulic pressure command signal), which sets the gear of the automatic transmission 3, to the hydraulic pressure control circuit 300. In response to the solenoid control signal, excitation and deexcitation of linear solenoid valves or on/off solenoid valves of the hydraulic pressure control circuit 300 are controlled, and the clutches C1 to C4, brakes B1 to B4, the one-way clutches F0 to F3, and the like, of the automatic transmission 3 are engaged or released into a predetermined state to establish the appropriate gear (first gear to sixth gear and reverse gear).

Furthermore, the ECU 100 outputs a lock-up clutch control signal (hydraulic pressure command signal) to the hydraulic pressure control circuit 300. In response to the lock-up clutch control signal, excitation or deexcitation of a lock-up solenoid valve of the hydraulic pressure control circuit 300 is controlled, so that the lock-up clutch 25 of the torque converter 2 is engaged or released (lock-up control) as appropriate.

The shift control and lock-up control executed by the ECU 100 will be described below.

First, a shift line map used for the shift control of this example will be described with reference to FIG. 7. The shift line map shown in FIG. 7 uses a vehicle speed and an accelerator operation amount as parameters. A plurality of regions are set in the shift line map for calculating an appropriate gear (gear that gives an optimum fuel consumption) based on the vehicle speed and accelerator operation amount. The shift line map is stored in the ROM 102 of the ECU 100. The regions of the shift line map are separated by a plurality of shift lines (gear shift lines).

Figure 7:
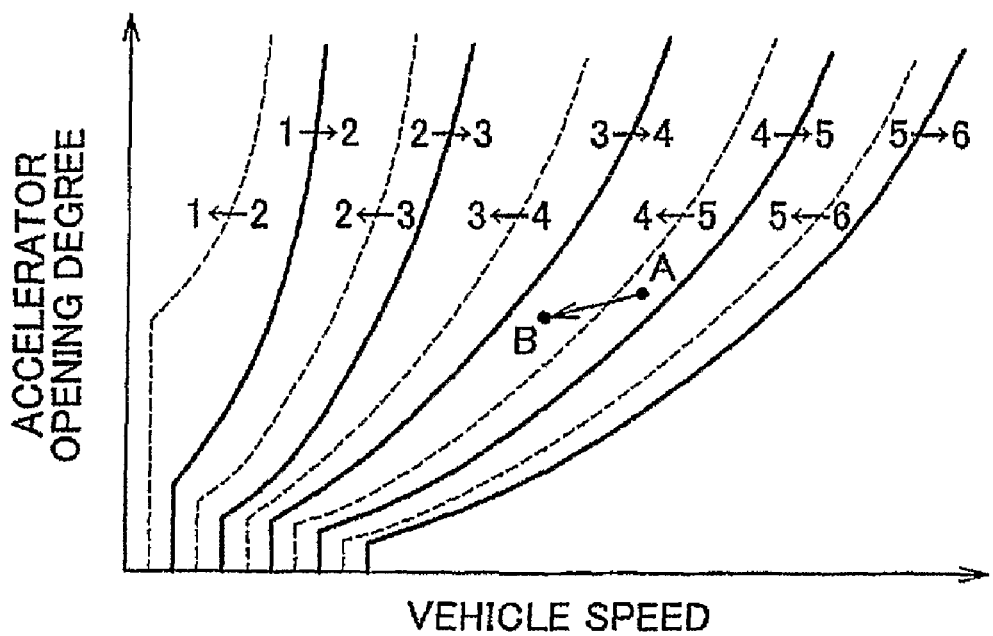
FIG. 7 is a view that shows an example of a shift line map used in the shift control.

Note that in the shift line map shown in FIG. 7, upshift lines (shift lines) are indicated by the solid lines, and downshift lines (shift lines) are indicated by the broken lines. In addition, shift directions of upshifts and downshifts are indicated using numerals and arrows in the drawing.

Next, the basic operation of the shift control will be described. The ECU 100 calculates the vehicle speed from the signal output from the output shaft speed sensor 204 and calculates the accelerator operation amount from the signal output from the accelerator operation amount sensor 205. Then, based on the vehicle speed and accelerator operation amount, the ECU 100 refers to the shift line map of FIG. 7 to calculate a target gear, and compares the target gear with the current gear to determine whether shift operation is appropriate.

If the result of determination indicates that it is unnecessary to change gear, the ECU 100 outputs a solenoid control signal (hydraulic pressure command signal) to maintain the current gear to the hydraulic pressure control circuit 300.

On the other hand, if the target gear is different from the current gear, a shift control will be executed. For example, if the running state of the vehicle changes from the situation where the automatic transmission 3 is in fifth gear and, for example, changes from point A to point B shown in FIG. 7, the change crosses a downshift line 5→4, so that the target gear calculated from the shift line map is fourth gear. Then, the ECU 100 outputs a solenoid control signal (hydraulic pressure command signal) for setting the fourth gear to the hydraulic pressure control circuit 300, and the gear is shifted from the fifth gear to the fourth gear (5→4 downshift).

The engagement line map used in the lock-up control of this example will be described with reference to FIG. 8. The engagement line map shown in FIG. 8 uses a vehicle speed and an accelerator operation amount as parameters. Regions (on region and off region) are set in the engagement line map for determining whether the lock-up clutch 25 is engaged or released on the basis of those vehicle speed and accelerator operation amount. The engagement line map is stored in the ROM 102 of the ECU 100.

Figure 8:
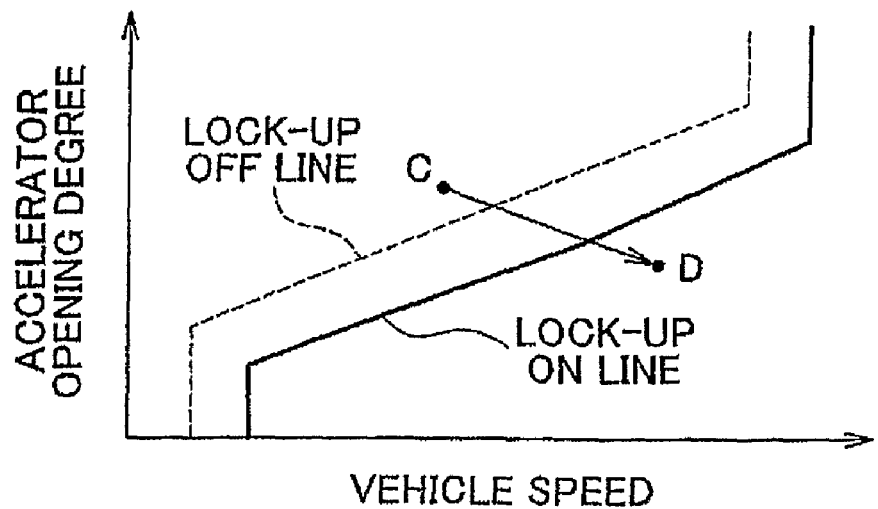
FIG. 8 is a view that shows an example of an engagement line map used in lock-up control.

In the engagement line map shown in FIG. 8, a lock-up ON line is indicated by the solid line, and a lock-up OFF line is indicated by the broken line. The lock-up ON line (solid line) and lock-up OFF line (broken line) are set with a predetermined hysteresis. The hysteresis is provided in order to prevent gear hunting. In addition, in the engagement line map shown in FIG. 8, the lock-up ON line and the lock-up OFF line are set to optimize fuel consumption based on the vehicle speed and the accelerator operation amount.

Then, the ECU 100 refers to the engagement line map of FIG. 8 on the basis of the vehicle speed and accelerator operation amount acquired from signals output from the output shaft speed sensor 204 and the accelerator operation amount sensor 205 and then engages or releases the lock-up clutch 25, as appropriate.

Specifically, if the lock-up clutch 25 is disengaged (OFF), when the vehicle speed increases and/or the accelerator operation amount reduces to cross the lock-up ON line (solid line) (lock-up OFF→ON), it is determined that the lock-up ON condition is satisfied and, then, engagement control of the lock-up clutch 25, which will be described later, is executed.

On the other hand, in a state where the lock-up clutch 25 is engaged (ON), when the vehicle speed decreases and/or the accelerator operation amount increases to cross the lock-up OFF line (broken line) (lock-up ON→OFF), it is determined that the lock-up OFF condition is satisfied and then the lock-up clutch 25 is released.

Next, the lock-up clutch engagement control will be described. First, as described above, it is determined, by referring to the engagement line map shown in FIG. 8 based on the vehicle speed and the accelerator operation amount, whether the lock-up ON condition or the lock-up OFF condition is satisfied. In the vehicle that executes control for engaging or releasing the lock-up clutch 25, as described above, when the rotational speed difference between the engine speed Ne and the turbine speed Nt of the torque converter 2 is large (i.e. exceeds a predetermined amount), it may be difficult to ensure durability of the friction material of the lock-up clutch 25 due to excessive heating of the lock-up clutch 25 at the time of engagement.

Taking into consideration the above, in this example, if the rotational speed difference (Ne−Nt) between the engine speed Ne and the turbine speed Nt is large when it is determined that the lock-up ON condition (OFF→ON) is satisfied, the torque of the engine 1 is reduced. If the rotational speed difference (Ne−Nt) between the engine speed Ne and the turbine speed Nt has reached a level at which durability of the friction material of the lock-up clutch 25 may be ensured through the torque reduction control, the lock-up clutch 25 is engaged.

Figure 9:
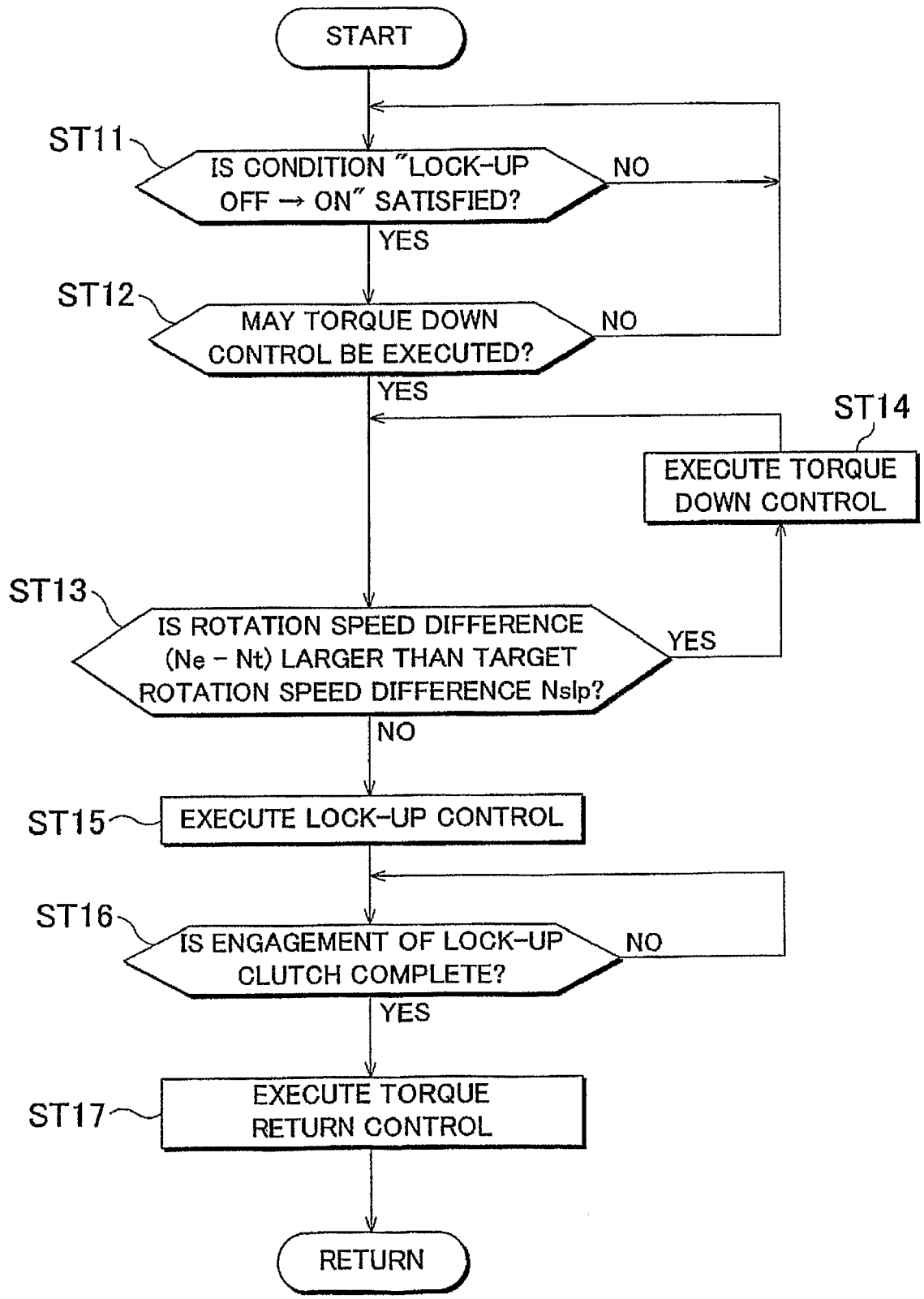
FIG. 9 is a flowchart that shows an example of lock-up clutch engagement control.
Figure 10:
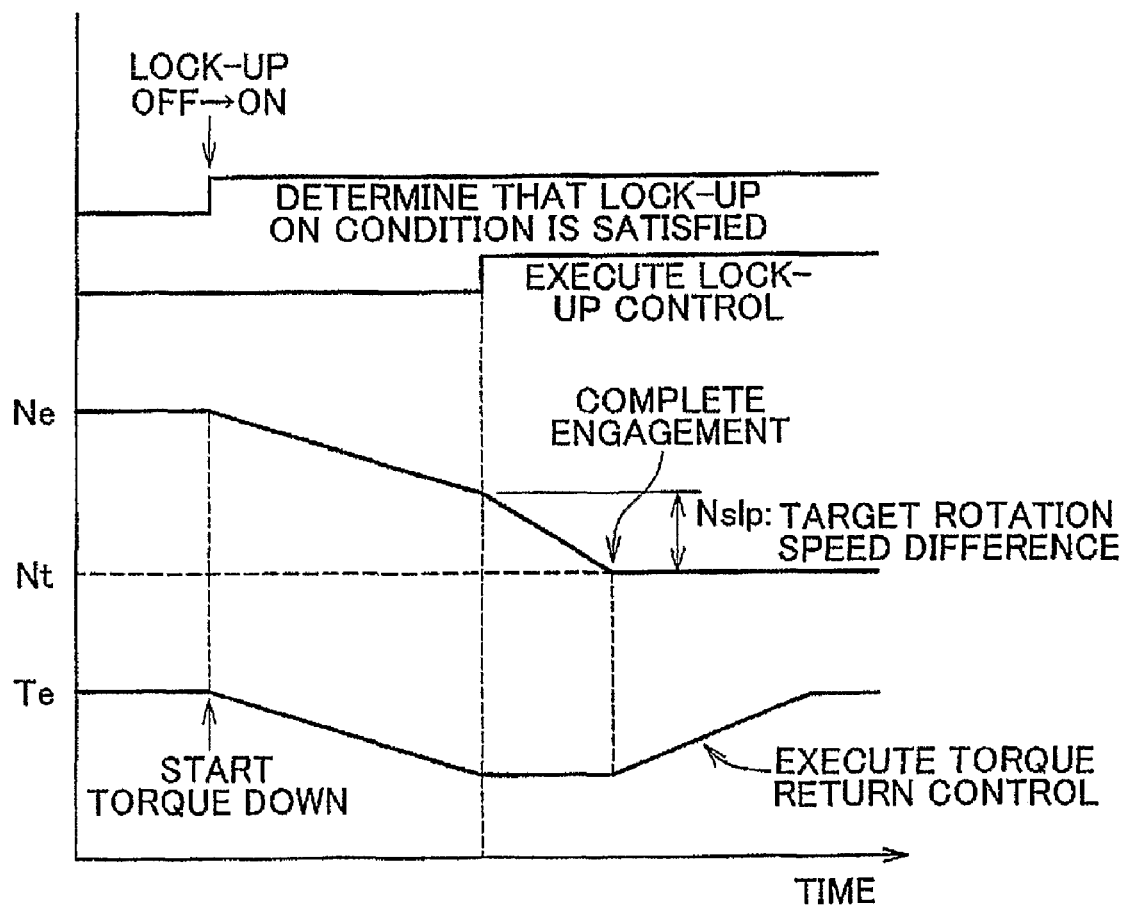
FIG. 10 is a timing chart that shows an example of the lock-up clutch engagement control.

A specific example of the control will be described with reference to FIG. 9 and FIG. 10. FIG. 9 is a flowchart that shows an example of a control routine of the lock-up clutch engagement control. The control routine shown in FIG. 9 is executed by the ECU 100.

First, in the control routine shown in FIG. 9, the engagement control of the lock-up clutch 25 is executed using a target rotational speed difference Nslp.

For example, the relationship between a rotational speed difference (Ne−Nt) between the engine speed Ne and the turbine speed Nt and a heating value of the lock-up clutch 25 at the time of engagement is empirically obtained or obtained by calculation in advance. The rotational speed difference of a level at which durability of the friction material of the lock-up clutch 25 may be ensured on the basis of the relationship between the rotational speed difference (Ne−Nt) and the heating value at the time of engagement and the capacity (heat capacity) of the friction material of the lock-up clutch 25. Then, the target rotational speed difference Nslp is set on the basis of the obtained rotational speed difference (Ne−Nt).

In addition, in this example, during execution of the control routine of FIG. 9, the process of calculating the engine speed Ne from a signal output from the engine speed sensor 201, calculating the turbine speed Nt from a signal output from the turbine speed sensor 203, and calculating the difference rotational speed (Ne−Nt) between those engine speed Ne and turbine speed Nt is executed at predetermined time intervals. In step ST13 of FIG. 9, which will be described later, determination is ordinarily made on the basis of the latest calculated rotational speed difference (Ne−Nt).

Next, the lock-up clutch engagement control of this example will be described for each step. In step ST11, it is determined whether the condition "lock-up OFF→ON" is satisfied. Specifically, for example, if the running state of the vehicle changes from the situation in which the vehicle is running in a lock-up OFF state, for example, changes from point C to point D shown in FIG. 8, the change crosses the lock-up ON line (solid line). Thus, it is determined that the lock-up ON condition is satisfied (the result of determination in step ST11 is affirmative), the process proceeds to step ST12. If the result of determination in step ST11 is negative, the determination process in step ST11 is repeated until the condition "lock-up OFF→ON" is satisfied.

In step ST12, it is determined whether torque reduction control of the engine 1 may be executed. Specifically, for example, if the coolant temperature of the engine 1 is low, or when sensors such as the throttle opening degree sensor 202 are malfunctioning, it is determined that execution of the torque reduction control is not allowed.

If the result of determination in step ST12 is affirmative, the process proceeds to step ST13. If the result of determination in step ST12 is negative, the process returns to step ST11.

In step ST13, it is determined whether the rotational speed difference (Ne−Nt) between the engine speed Ne and the turbine speed Nt is larger than the target rotational speed difference Nslp. If the result of determination in step ST13 is affirmative (Ne−Nt>Nslp), the torque reduction control is executed (step ST14). In this example, an output torque of the engine 1 (engine torque Te) is reduced in decrements of a predetermined amount by controlling the reduction in fuel injection amount, thus reducing the torque. The torque reduction control in step ST14 is sequentially executed repeatedly until the result of determination in step ST13 is negative.

Then, if the result of determination in step ST13 is negative, that is, when the rotational speed difference (Ne−Nt) between the engine speed Ne and the turbine speed Nt has been reduced to the target rotational speed difference Nslp (that is, when the rotational speed difference (Ne−Nt) is smaller than or equal to the target rotational speed difference Nslp), the lock-up control is executed (step ST15). After the lock-up control has been started, a torque return control is executed when engagement of the lock-up clutch 25 is complete (at the time when the result of determination in step ST16 is affirmative) (step ST17). Thus, the engine torque Te is returned to a normal control state.

The lock-up clutch engagement control of this example will be specifically described with reference to the timing chart of FIG. 10. First, if the lock-up clutch 25 is disengaged (lock-up OFF), when the vehicle speed increases and/or the accelerator operation amount decreases to cross the lock-up ON line (solid line) of the engagement line map shown in FIG. 8 (lock-up OFF→ON), it is determined that the lock-up ON condition is satisfied.

If the rotational speed difference (Ne−Nt) between the engine speed Ne and the turbine speed Nt is smaller than or equal to the target rotational speed difference Nslp (Ne−Nt≧Nslp) when it is determined that the lock-up ON condition is satisfied, the durability of the friction material may be ensured even when the lock-up clutch 25 is engaged. Thus, the lock-up control is immediately executed (negative determination in step ST13→step ST15).

On the other hand, if the rotational speed difference (Ne−Nt) is large when it is determined that the lock-up ON condition is satisfied, and the lock-up control is immediately executed, the friction material of the lock-up clutch 25 may be subjected to thermal degradation. Thus, to avoid this situation, torque reduction control is executed (affirmative determination in step ST13→a step ST14). Because the torque reduction control in step ST14 is repeated, the engine torque Te will reduce in decrements of a predetermined amount.

Then, at the time when the engine torque Te has been reduced to the target rotational speed difference Nslp, the torque reduction control is ended and then the lock-up control (lock-up clutch engagement) is started. After that, when engagement of the lock-up clutch 25 is complete, that is, at the time when the engine speed Ne and the turbine speed Nt become equal, torque return control (torque up control) is executed to thereby return the engine torque Ne to a normal control state.

As described above, according to the lock-up clutch engagement control of this example, if the rotational speed difference (Ne−Nt) between the engine speed Ne and the turbine speed Nt is large when it is determined that the lock-up ON condition is satisfied, the torque reduction control for the engine 1 is executed, and then the lock-up clutch 25 is engaged after the rotational speed difference (Ne−Nt) has been reduced to the target rotational speed difference Nslp. Thus, it is possible to suppress excessive heating of the friction material of the lock-up clutch 25. By so doing, without increasing the heat capacity of the friction material of the lock-up clutch 25, durability of the friction material may be ensured. As a result, the size of the lock-up clutch 25 may be reduced.

Here, the performance of a torque converter may be expressed by capacity coefficient C=engine torque Te/(engine speed Ne)$^2$. The capacity coefficient C, once the specifications of the torque converter are determined, is known from a speed ratio (turbine speed Nt/engine speed Ne) corresponding to the target rotational speed difference. Thus, an engine torque Te0 necessary for achieving the target rotational speed difference Nslp may be calculated from the following Expression (1).

$$Te0 = C \times (Nt + Nslp)^2 \qquad (1)$$

Thus, it is applicable that when the above described torque reduction control is executed, the engine torque Te0 that achieves the target rotational speed difference Nslp is obtained through the above Expression (1) using the turbine speed Nt at that moment to calculate a torque reduction amount, and then the torque reduction control in step ST14 is executed based on the calculated torque reduction amount.

In addition, the rate of heat absorption E of the friction material of the lock-up clutch may be expressed by the following Expression (2), where a transmission torque is T(t) and a variation in rotational speed of the engine due to engagement of the lock-up clutch is ω(t).

$$E=\int T(t) \times \omega(t)dt \qquad (2)$$

Then, using Expression (2), the transmission torque T(t) is adjusted before engagement of the lock-up clutch 25 so that a heating value that is generated at the time when the lock-up clutch 25 is engaged is smaller than or equal to a predetermined reference value to thereby ensure durability of the friction material.

Next, another example of the lock-up clutch engagement control will be described with reference to FIG. 11 and FIG. 12. First, in the control routine shown in FIG. 11, engagement control of the lock-up clutch 25 is executed using an upper limit rotational speed difference LNslp and a target rotational speed difference Nslp.

In consideration of a heating value (heating value due to shearing of hydraulic fluid) of the torque converter 2, generated due to the rotational speed difference (Ne−Nt) between the engine speed Ne and the turbine speed Nt when the lock-up clutch 25 is released and the cooling capability of the vehicle, the rotational speed difference (Ne−Nt) at which hydraulic fluid of the torque converter 2 does not overheat is empirically obtained or obtained by calculation. Then, the upper limit rotational speed difference LNslp is set based on the obtained rotational speed difference (Ne−Nt).

The target rotational speed difference Nslp is set as in a similar manner to the above described lock-up clutch engagement control (1). However, the target rotational speed difference Nslp is below the upper limit rotational speed difference LNslp.

Next, the lock-up clutch engagement control will be described with reference to FIG. 11. The control routine shown in FIG. 11 is executed by the ECU 100.

Figure 11:
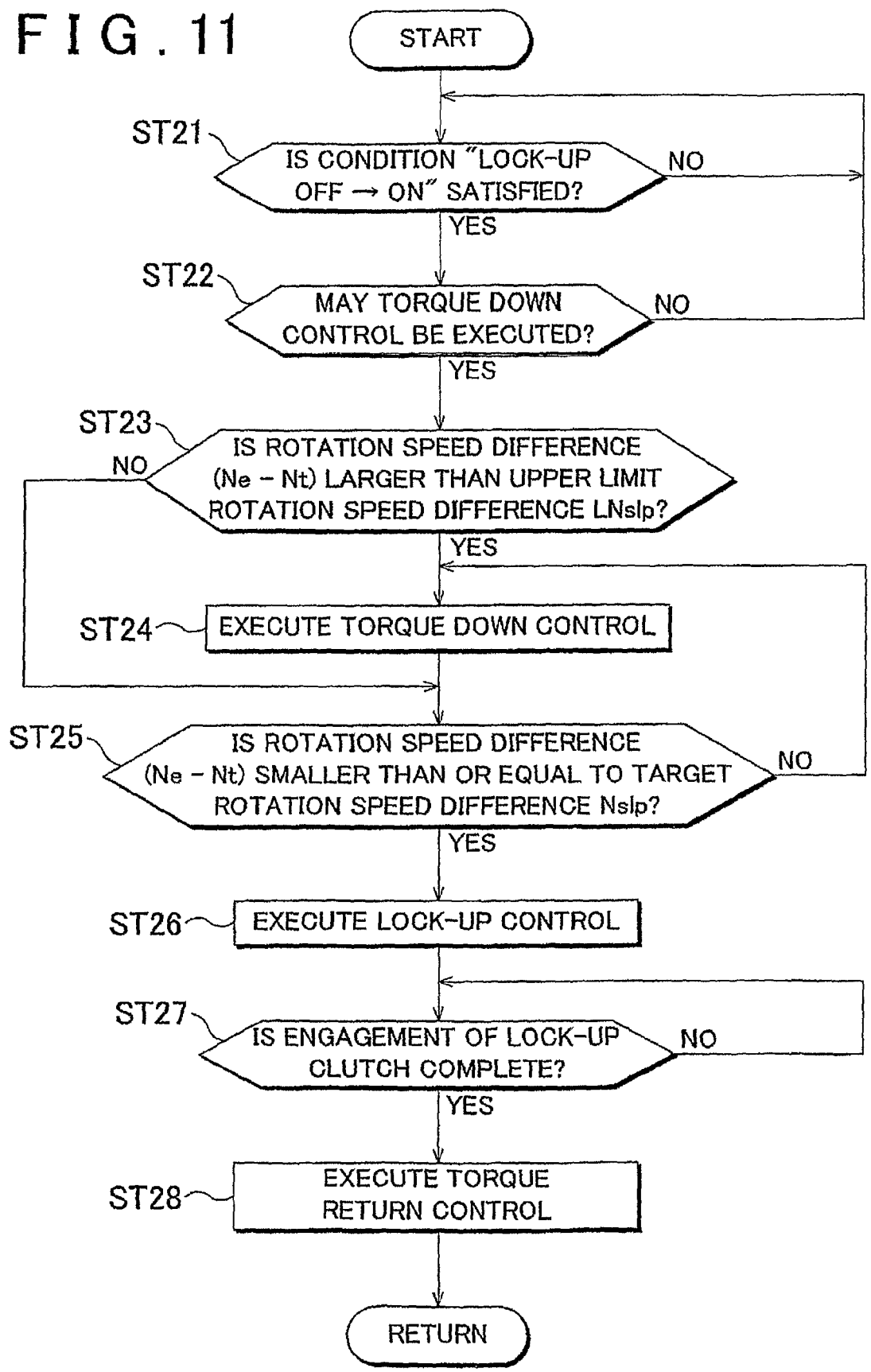
FIG. 11 is a flowchart that shows another example of the lock-up clutch engagement control.
Figure 12:
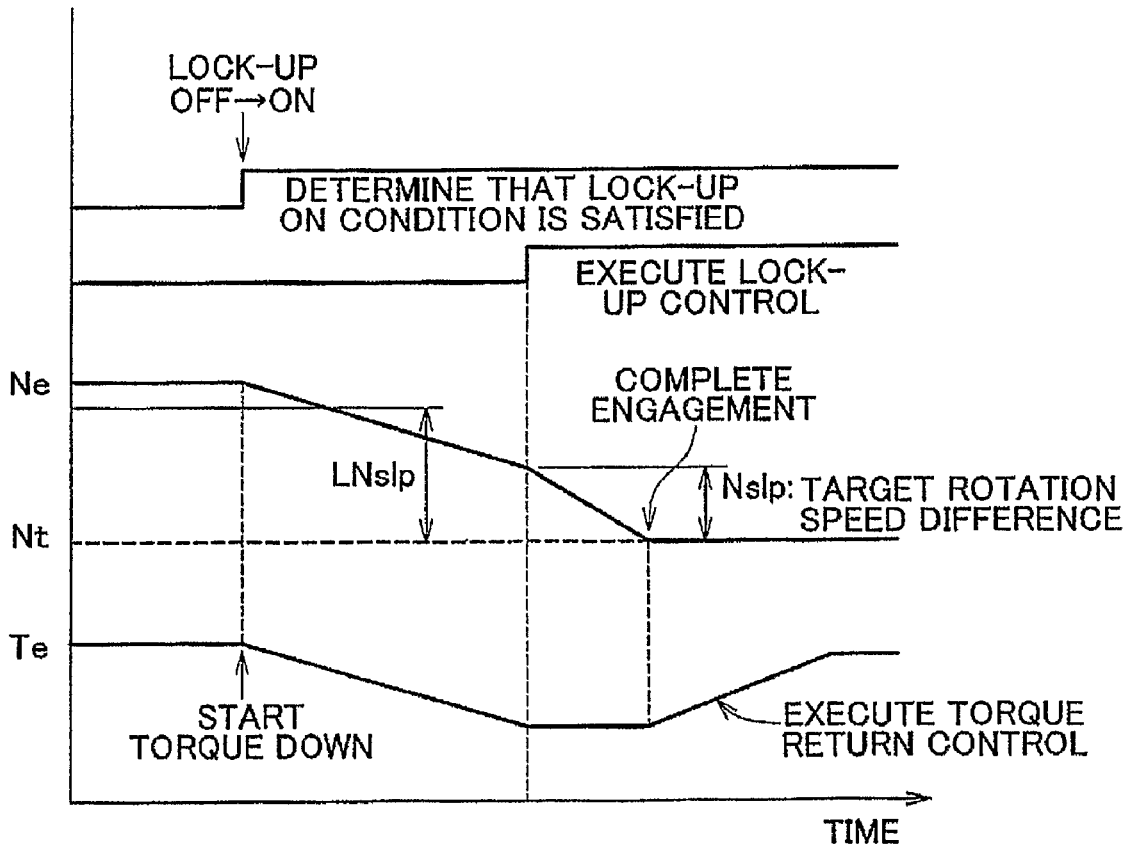
FIG. 12 is a timing chart that shows another example of the lock-up clutch engagement control.

In addition, in this example, during execution of the control routine of FIG. 11, the process of calculating the engine speed Ne from the signal output from the engine speed sensor 201, calculating the turbine speed Nt from the signal output from the turbine speed sensor 203, and calculating the difference rotational speed (Ne−Nt) between the engine speed Ne and turbine speed Nt is sequentially executed repeatedly at predetermined time intervals. In step ST23 and ST25 of FIG. 11, which will be described later, determination is ordinarily made based on the latest calculated rotational speed difference (Ne−Nt).

In step ST21, it is determined whether the condition "lock-up OFF→ON" is satisfied. For example, if the vehicle is running in a lock-up OFF state, when the running state of the vehicle changes, for example, changes from point C to point D shown in FIG. 8, the change crosses the lock-up ON line (solid line). Thus, it is determined that the lock-up ON condition is satisfied (the result of determination in step ST21 is affirmative), the process proceeds to step ST22. If the result of determination in step ST21 is negative, the determination process in step ST21 is repeated until the condition "lock-up OFF→ON" is satisfied (until the affirmative determination is obtained).

In step ST22, it is determined whether torque reduction control for the engine 1 may be executed. Specifically, for example, if the coolant temperature of the engine 1 is low, or if sensors such as the throttle opening degree sensor 202 are malfunctioning, it is determined that execution of torque reduction control is not permitted.

If the result of determination in step ST22 is affirmative, the process proceeds to step ST23. If the result of determination in step ST22 is negative, the process returns to step ST21.

In step ST23, it is determined whether the rotational speed difference (Ne−Nt) between the engine speed Ne and the turbine speed Nt exceeds the upper limit rotational speed difference LNslp.

When the result of determination in step ST23 is negative (Ne−Nt≦LNslp), the process proceeds to step ST25, and it is determined whether the rotational speed difference (Ne−Nt) is smaller than or equal to the target rotational speed difference Nslp. If the result of determination in step ST25 is negative, that is, if the rotational speed difference (Ne−Nt) exceeds the target rotational speed difference Nslp (Ne−Nt>Nslp), the torque reduction control is executed (step ST24). In this example, the output torque of the engine 1 (engine torque Te) is reduced in decrements of a predetermined amount, by controlling the reduction in fuel injection amount, thus reducing the torque. The torque reduction control in step ST24 is sequentially executed repeatedly until the result of determination in step ST25 is affirmative.

On the other hand, if the result of determination in step ST23 is affirmative (Ne−Nt>LNslp), the torque reduction control is executed (step ST24). The torque reduction control in step ST24 is sequentially executed repeatedly until the result of determination in step ST25 is affirmative.

Then, once the result of determination in step ST25 is affirmative, that is, if the rotational speed difference (Ne−Nt) between the engine speed Ne and the turbine speed Nt has been reduced to the target rotational speed difference Nslp, the lock-up control is executed (step ST26). After the lock-up control has been started, torque return control is executed when engagement of the lock-up clutch 25 is complete (when the result of determination in step ST27 is affirmative) (step ST28). Thus, the engine torque Te is returned to a normal control state.

The lock-up clutch engagement control of this example will be specifically described with reference to the timing chart of FIG. 12.

First, if the lock-up clutch 25 is disengaged (lock-up OFF), when the vehicle speed increases and/or the accelerator operation amount decreases to cross the lock-up ON line (solid line) of the engagement line map shown in FIG. 8 (lock-up OFF→ON), it is determined that the lock-up ON condition is satisfied.

If the rotational speed difference (Ne−Nt) between the engine speed Ne and the turbine speed Nt is smaller than or equal to the upper limit rotational speed difference LNslp and smaller than or equal to the target rotational speed difference Nslp (negative determination in step ST23, affirmative determination in step ST25) when it is determined that the lock-up ON condition is satisfied, durability of the friction material may be ensured even if the lock-up clutch 25 is engaged. Thus, the lock-up control is immediately executed.

On the other hand, if the rotational speed difference (Ne−Nt) exceeds the upper limit rotational speed difference LNslp when it is determined that the lock-up ON condition is satisfied, hydraulic fluid of the torque converter 2 may possibly overheat if this situation is continued. Thus, the torque reduction control is executed (affirmative determination in step ST23→step ST24).

Even if the rotational speed difference (Ne−Nt) is smaller than or equal to the upper limit rotational speed difference LNslp, the friction material of the lock-up clutch 25 may possibly be subjected to thermal degradation if the lock-up control is executed in situations where the rotational speed difference (Ne−Nt) exceeds the target rotational speed difference Nslp. To avoid this situation, the torque reduction control is executed (negative determination in step ST25→step ST24).

As the torque reduction control is executed in this way, the engine torque Te decreases in decrements of a predetermined amount. Then, when the engine torque Te has been reduced to the target rotational speed difference Nslp, the torque reduction control ends and then the lock-up control (lock-up clutch engagement) is started. After that, when the engagement of the lock-up clutch 25 is complete, that is, when the engine speed Ne and the turbine speed Nt are equal, torque return control is executed to thereby return the engine torque Ne to a normal control state.

As described above, according to the lock-up clutch engagement control of this example, if the rotational speed difference (Ne−Nt) between the engine speed Ne and the turbine speed Nt is large when it is determined that the lock-up ON condition is satisfied, the torque reduction control of the engine 1 is executed, and after the rotational speed difference (Ne−Nt) has been reduced to the target rotational speed difference Nslp, the lock-up clutch 25 is engaged. Thus, it is possible to suppress excessive heating of the friction material of the lock-up clutch 25. By so doing, without increasing the heat capacity of the friction material of the lock-up clutch 25, durability of the friction material may be ensured. As a result, the size of the lock-up clutch 25 may be reduced.

Furthermore, if the rotational speed difference (Ne−Nt) between the engine speed Ne and the turbine speed Nt is exceeds the upper limit rotational speed difference LNslp before the lock-up clutch 25 is engaged, the torque reduction control is executed. Thus, it is possible to suppress excessive heating of the torque converter 2 (heating due to shearing of hydraulic fluid), thus making it possible to prevent hydraulic fluid of the torque converter 2 from overheating.

In the above example, if the rotational speed difference (Ne−Nt) between the engine speed Ne and the turbine speed Nt is large, torque reduction control is executed so that an output torque of the engine 1 is reduced in decrements of a prescribed value (predetermined amount of torque). The aspects of the invention are not restricted to this.

For example, the torque reduction amount may be determined through feedback based on a variation in the rotational speed difference (Ne−Nt) between the engine speed Ne and the turbine speed Nt. In this case, control specifications will be complex; however, a constant (prescribed value) used for control may be omitted.

In the above example, torque is reduced by controlling reduction in fuel injection amount. Alternatively, an output torque of the engine may be reduced by controlling retardation of ignition timing. In addition, if a variable valve timing mechanism (VVT mechanism) is provided to vary the timing of the engine valve (intake valve, exhaust valve), the valve timing may be adjusted by the VVT mechanism to reduce the output torque of the engine.

Note that the torque may be reduced by any one of the fuel injection amount reduction control, ignition timing retardation control or valve timing change control using the VVT mechanism, alone or in combination.

Here, the target rotational speed difference will be described. In the above example, the rotational speed difference Nslp is set in consideration of the heat capacity of the lock-up clutch. However, the aspects of the invention are not restricted to this. For example, in consideration of the fact that a heating value of the lock-up clutch at the time of engagement is high when the difference between an input torque of the lock-up clutch and an output torque of the lock-up clutch is large, the target rotational speed difference Nslp may be set based on the difference between the input torque and the output torque.

Moreover, the target rotational speed difference Nslp may be calculated by inputting, into the ECU, data related to the heat capacity, such as the size, the material, and the number of sheets of the friction material, of the lock-up clutch.

Furthermore, the upper limit rotational speed difference will be described below. In the above example, the upper limit rotational speed difference LNslp used for determining whether to execute the torque reduction control is set in consideration of a heating value (heating value due to shearing of hydraulic fluid) of the torque converter and the cooling capability of the vehicle. The aspects of the invention are not restricted to this. The upper limit rotational speed difference LNslp may be set in consideration of the upper limit value of a lock-up control executable range, which is determined on the basis of other parameters, such as a heating value of the lock-up clutch at the time of engagement, the magnitude of a torque step that occurs on the axles when the lock-up clutch is engaged, or the controllability of the lock-up control mechanism.

In the above example, the aspects of the invention are applied to a vehicle in which the forward six gear automatic transmission is installed. The aspects of the invention are not restricted to this. The aspects of the invention may also be applied to control for a vehicle in which a planetary gear automatic transmission having any number of selectable gears is installed.

In the above example, the aspects of the invention are applied to a control for a vehicle in which the planetary gear transmission, which sets a gear ratio using the clutches, brakes and planetary gear sets, is installed. The aspects of the invention are not restricted to this. The aspects of the invention may also be applied to a control for a vehicle in which a belt-type continuously variable transmission (CVT), which includes a torque converter having a lock-up clutch, is installed.

In the above example, the aspects of the invention are applied to control for the vehicle in which the gasoline engine is installed. The aspects of the invention are not restricted to this. Instead, the aspects of the invention may also be applied to control for a vehicle in which an engine of another type, such as a diesel engine, is installed.

Furthermore, the aspects of the invention are not restricted to the FR (front-engine, rear-wheel-drive) vehicle. The aspects of the invention may also be applied to control for an FF (front-engine, front-wheel-drive) vehicle or a four-wheel drive vehicle.

The invention claimed is:

1. A control device for a vehicle that includes an engine; an automatic transmission; a torque converter arranged between the engine and the automatic transmission; and a lock-up clutch that connects an input side of the torque converter with an output side of the torque converter, the control device comprising:
   an engine speed detector that detects a rotational speed of the engine;
   a turbine speed detector that detects a turbine speed of the torque converter;

a rotational speed difference calculation unit that calculates a rotational speed difference between the engine speed and the turbine speed;

a torque reduction control unit that executes a torque reduction control to reduce an output torque of the engine;

a lock-up control unit that controls engagement or release of the lock-up clutch; and a lock-up determination unit that determines whether a lock-up ON condition is satisfied;

wherein the control device is configured such that:

if the lock-up determination unit determines that the lock-up ON condition is satisfied, then the control device determines whether the rotational speed difference calculated exceeds a predetermined target rotational speed difference, and if the control device determines that the rotational speed difference calculated exceeds the target rotational speed difference, then the lock-up control unit controls the lock-up clutch to be engaged after the torque reduction control is executed until the control device determines that the rotational speed difference calculated has been reduced to the target rotational speed difference.

2. The control device according to claim 1, wherein the control device is configured such that:

if the lock-up determination unit determines that the lock-up ON condition is satisfied, then before the control device determines whether or not the rotational speed difference calculated exceeds the predetermined target rotational speed difference, the control device first determines whether the rotational speed difference calculated exceeds an upper limit rotational speed difference, if the control device determines that the rotational speed difference calculated exceeds the upper limit rotational speed difference, then the lock-up control unit controls the lock-up clutch to be engaged after the torque reduction control is executed until the control device determines that the rotational speed difference calculated is less than or equal to the target rotational speed difference.

3. The control device according to claim 2, wherein the upper limit rotational speed difference is set in consideration of a heating value of hydraulic fluid of the torque converter and a cooling capability of the vehicle.

4. The control device according to claim 2, wherein the upper limit rotational speed difference is set in consideration of a heating value of the lock-up clutch at the time of engagement.

5. The control device according to claim 2, wherein the upper limit rotational speed difference is set in consideration of a change in torque that occurs on an axle of the engine or the torque converter when the lock-up clutch is engaged.

6. The control device according to claim 1, wherein the torque reduction control unit reduces the output torque of the engine by at least one of:

controlling a reduction in throttle opening degree, controlling a retardation of ignition timing, or controlling a change of valve timing.

7. The control device according to claim 1, wherein the target rotational speed difference is set in consideration of a heat capacity of the lock-up clutch.

8. The control device according to claim 1, wherein the target rotational speed difference is set in consideration of a heating value of the lock-up clutch at the time of engagement.

9. The control device according to claim 1, wherein the target rotational speed difference is set in consideration of a difference between an input torque of the lock-up clutch and an output torque of the lock-up clutch.

10. A control method for a vehicle that includes an engine; an automatic transmission; a torque converter arranged between the engine and the automatic transmission; and a lock-up clutch that connects an input side of the torque-converter with an output side of the torque converter, the control method comprising:

determining whether a lock-up ON condition is satisfied;

if it is determined that the lock-up ON condition is satisfied, then executing operations comprising:

detecting a rotational speed of the engine;

detecting a turbine speed of the torque converter;

calculating a rotational speed difference between the engine speed and the turbine speed;

determining whether the rotational speed difference calculated exceeds a predetermined target rotational speed difference;

if the rotational speed difference calculated exceeds the target rotational speed difference, then controlling the lock-up clutch to be engaged after executing torque reduction control to reduce an output torque of the engine until it is determined that the rotational speed difference calculated has been reduced to the target rotational speed difference.

11. The control method according to claim 10, further comprising:

it is determined that the lock-up ON condition is satisfied, then before the determining whether the rotational speed difference calculated exceeds the predetermined target rotational speed difference, first determining whether the rotational speed difference calculated exceeds an upper limit rotational speed difference; and if it is determined that the rotational speed difference calculated exceeds the upper limit rotational speed difference, then controlling the lock-up clutch to be engaged after executing the torque reduction control until it is determined that the rotational speed difference calculated is less than or equal to the target rotational speed difference.

* * * * *